United States Patent
Valin et al.

(10) Patent No.: US 9,967,594 B2
(45) Date of Patent: May 8, 2018

(54) PROBABILITY MODELING OF INTRA PREDICTION MODES

(71) Applicant: MOZILLA CORPORATION, Mountain View, CA (US)

(72) Inventors: Jean-Marc Valin, Montreal (CA); Timothy B. Terriberry, Mountain View, CA (US)

(73) Assignee: Mozilla Corporation, Mountain View, CA (US)

(*) Notice: Subject to any disclaimer, the term of this patent is extended or adjusted under 35 U.S.C. 154(b) by 233 days.

(21) Appl. No.: 14/318,269

(22) Filed: Jun. 27, 2014

(65) Prior Publication Data
US 2015/0003523 A1    Jan. 1, 2015

Related U.S. Application Data

(60) Provisional application No. 61/841,208, filed on Jun. 28, 2013, provisional application No. 61/841,561, filed on Jul. 1, 2013.

(51) Int. Cl.
- *H04N 19/91* (2014.01)
- *H04N 19/13* (2014.01)
- *H04N 19/593* (2014.01)

(52) U.S. Cl.
CPC ............ *H04N 19/91* (2014.11); *H04N 19/13* (2014.11); *H04N 19/593* (2014.11)

(58) Field of Classification Search
None
See application file for complete search history.

(56) References Cited

U.S. PATENT DOCUMENTS

| | | | | |
|---|---|---|---|---|
| 2002/0037111 A1* | 3/2002 | Kimura | .................... | H04N 1/41 382/238 |
| 2003/0206594 A1* | 11/2003 | Zhou | .................... | H04N 19/105 375/240.16 |

(Continued)

OTHER PUBLICATIONS

K. Zhang, X. Ji, Q. Huang, D. Zhao and W. Gao, "An efficient coding method for intra prediction mode information," 2009 IEEE International Symposium on Circuits and Systems, Taipei, 2009, pp. 2814-2817. doi: 10.1109/ISCAS.2009.5118387 URL: http://ieeexplore.ieee.org/stamp/stamp.jsp?tp=&arnumber=5118387&isnumber=5117665.*

(Continued)

*Primary Examiner* — Leron Beck
*Assistant Examiner* — Tyler W Sullivan
(74) *Attorney, Agent, or Firm* — Dergosits & Noah LLP; Todd A. Noah

(57) ABSTRACT

Systems and methods are described for predicting a mode value of a block of an image. Mode values are received for a predetermined number of neighboring blocks of the image. Each mode value may within a predetermined range of integer values. Using a probability table, a probability of each mode value in the range of integers being selected may be computed. The probability table may have a first axis that includes every integer value within the range of integer values, and second axis that includes combinations of the neighboring blocks, each combination of the neighboring blocks representing a binary determination whether or not each neighboring block is equal to a corresponding integer value on the first axis. Based on the computed probabilities, a mode value for the block may be selected and coded by an entropy coder.

15 Claims, 6 Drawing Sheets

(56) References Cited

U.S. PATENT DOCUMENTS

| | | | | |
|---|---|---|---|---|
| 2004/0234144 | A1* | 11/2004 | Sugimoto | H04N 19/176 382/239 |
| 2008/0310504 | A1* | 12/2008 | Ye | H04N 19/197 375/240.02 |
| 2009/0003441 | A1* | 1/2009 | Sekiguchi | H04N 19/176 375/240.13 |
| 2010/0040138 | A1* | 2/2010 | Marpe | H04N 19/176 375/240.02 |
| 2011/0268188 | A1* | 11/2011 | Kim | H04N 7/345 375/240.12 |
| 2011/0274173 | A1* | 11/2011 | Ameres | H04N 7/50 375/240.16 |
| 2012/0082220 | A1* | 4/2012 | Mazurenko | H04N 19/00218 375/240.12 |
| 2012/0327999 | A1* | 12/2012 | Francois | H04N 19/11 375/240.02 |
| 2013/0114700 | A1* | 5/2013 | Moriya | H04N 19/105 375/240.03 |

OTHER PUBLICATIONS

Moffat et al., "Arithmetic Coding Revisited", ACM Transactions on Information Systems (TOIS). vol. 16, Issue 3, Jul. 1998, pp. 256-294.

Stuiver et al., "Piecewise Integer Mapping for Arithmetic Coding," Proc. of the 17th IEEE Data Compression conference (DCC), Mar./Apr. 1998, pp. 1-10.

* cited by examiner

PROBABILITY MODELING OF INTRA PREDICTION MODES

CROSS-REFERENCE TO RELATED APPLICATIONS

This application claims the benefit of U.S. Provisional Application No. 61/841,208, filed Jun. 28, 2013 and entitled "Probability Modelling Of Intra Prediction Modes," and U.S. Provisional Application No. 61/841,561, filed Jul. 1, 2013 and entitled "Probability Modelling Of Intra Prediction Modes," which are both incorporated herein in their entirety.

COPYRIGHT NOTICE

A portion of the disclosure of this patent document including any priority documents contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to digital encoding and decoding, and more specifically to models for using probabilities to model modes of intra prediction to facilitate encoding and decoding.

SUMMARY OF THE INVENTION

Systems and methods are described for predicting a mode value of a block of an image using one of an encoder and a decoder. A processor may receive mode values for a predetermined number of neighboring blocks of the image, the predetermined number being greater than two, a mode being a block classification that informs a decoder module of a predictive strategy to use for the block. Each mode value may be within a predetermined range of integer values. Using a probability table, the processor may compute probabilities of each mode value in the range of integers being selected for the block, given the mode values for each neighboring block. The probability table may have a first axis that includes every integer value within the range of integer values, and second axis that includes combinations of the neighboring blocks, each combination of the neighboring blocks representing a binary determination whether or not each neighboring block of the predetermined number of neighboring blocks is equal to a corresponding integer value on the first axis. The probability table may be populated by probabilities that the mode value of the block is equal to the corresponding integer value on the first axis. The processor may compute the probability of each mode being selected based on the binary determination for each of the predetermined number of neighboring blocks, and select a mode value for the block based on the computed probabilities of each mode value in the range of integers being selected. In various embodiments, the selection may be performed based on at least one of the quality of the prediction or the cost to code said mode value. The processor may then code said the selected mode value using an entropy coder.

In another embodiment, a probability table for predicting a mode value of a block of an image may be generated. A training corpus image may be received by a processor, the training corpus image including a plurality of blocks, each block having a mode value, and each block having a predetermined number of neighboring blocks. Each neighboring block may be associated with a mode value, a mode being a block classification that informs a predictive strategy to use for the block, each mode value falling within a range of integer values. The processor may generate a probability table, the probability table having a first axis comprising every integer value within the range of integer values, and second axis comprising combinations of the neighboring blocks, each combination of the neighboring blocks representing a binary determination whether or not each neighboring block of the predetermined number of neighboring blocks has an associated mode value equal to a corresponding integer value on the first axis. The processor may then populate the probability table probabilities observed in the plurality of blocks of the training corpus image. The populated probability table may be stored and subsequently used to predict mode values of an image used for intra prediction. Compared to conventional probability tables used to code mode values, the populated probability table may advantageously take up less space in memory.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Conventional video codecs and still image codecs generally make use of intra prediction, where a region (or block) of the image is predicted based on its surrounding blocks. There are usually multiple intra predictor modes, each performing a different kind of prediction. For example, some modes may predict along a particular direction, in which case the selected mode would typically represent the direction of the patterns in the region being coded. The mode is typically selected by the encoder and transmitted to the decoder. The cost of coding the mode can be large for small block sizes, so it is important to efficiently encode the information using entropy coding. See Moffat, A., Witten, I. H., "Arithmetic coding revisited", *ACM Transactions on Information Systems (TOIS)*. Vol. 16, Issue 3, pp. 256-294, July 1998 and Stuiver, L. and Moffat, A., "Piecewise Integer Mapping for Arithmetic Coding," *Proc. of the* 17*th IEEE Data Compression Conference (DCC)*, pp. 1-10, March/

April 1998, incorporated by reference. The following describes an efficient way of modeling mode probabilities.

Figure 1:
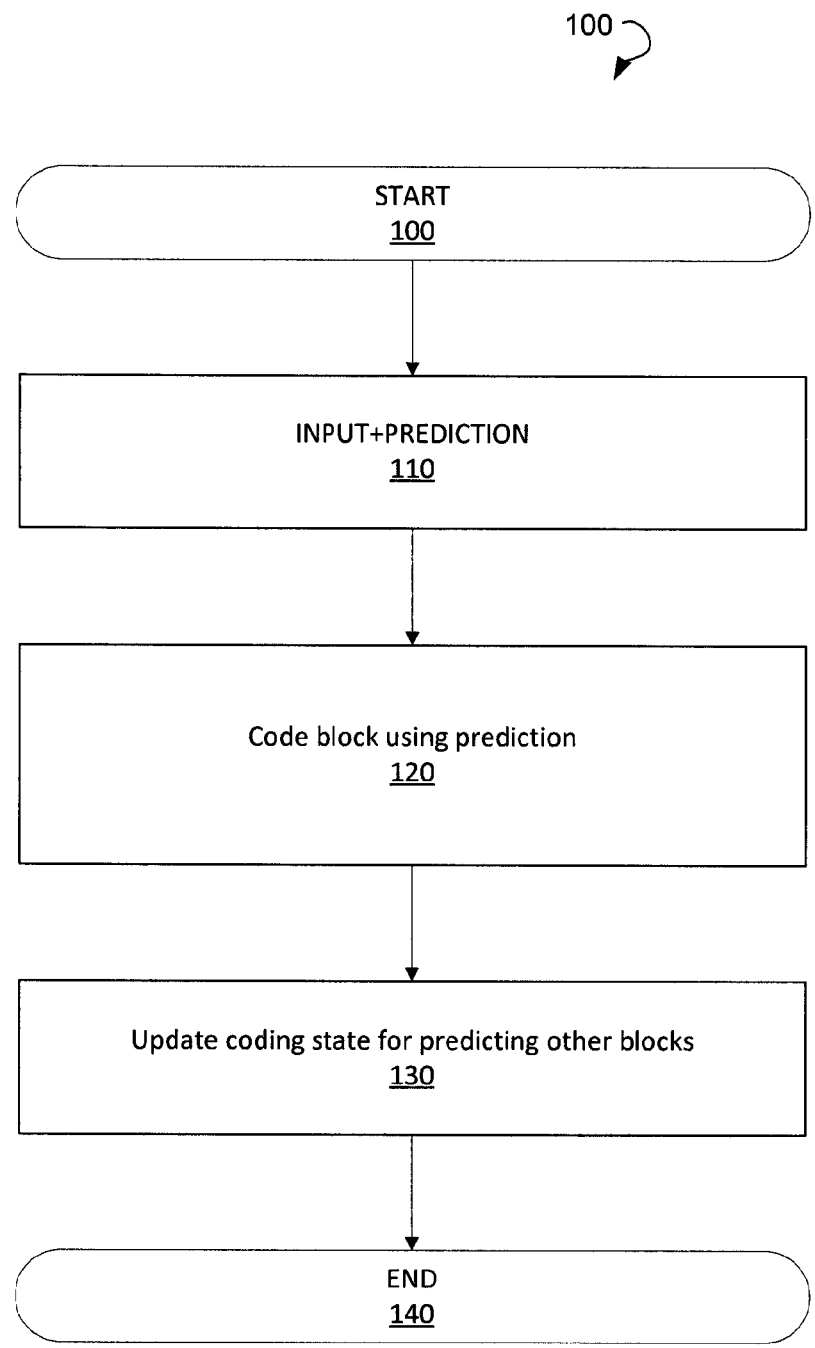
FIG. 1 shows a flow diagram for a method of encoding that uses intra prediction for use in a video or audio coding system, under an embodiment.

FIG. 1 shows a flow diagram for a method 100 of encoding that uses intra prediction for use in a video or audio coding system, under an embodiment. A start block 100 may pass control to an input and prediction block 110, which, in turn, may compute prediction modes and pass control to a function block 120. The block 120 may code the block with the computed prediction modes and pass control to a function block 130. Function block 130 may update the coding state for predicting other blocks in the image, and pass control to an end block 140.

Figure 2:
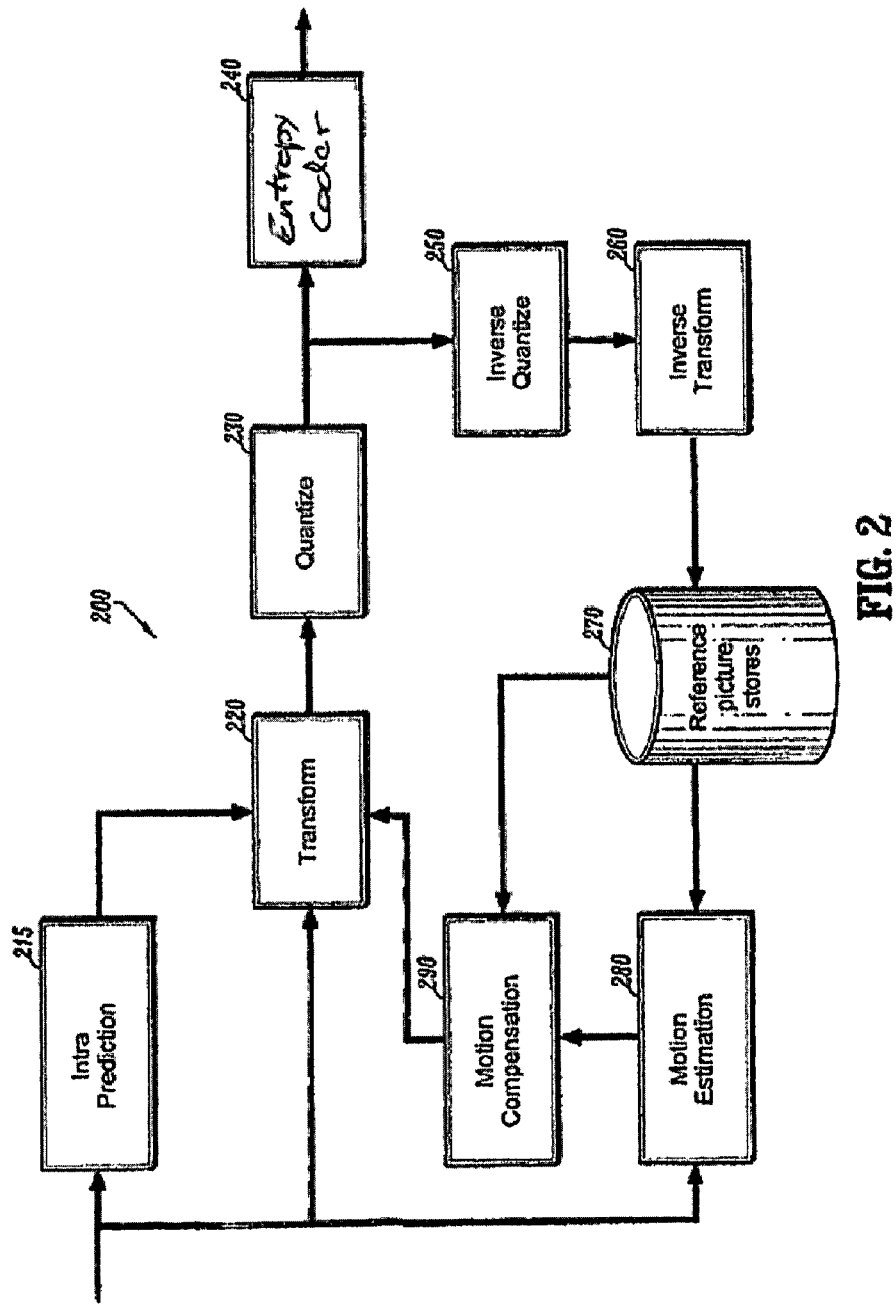
FIG. 2 shows a system diagram for a video encoder that uses intra prediction, under an embodiment.

Turning to FIG. 2, which shows a system diagram for a video encoder that uses intra prediction, under an embodiment, a video encoder is indicated generally by the reference numeral 200. An input to the encoder 200 may be communicatively coupled with a (possibly overlapped) block transform function 220.

The input to the encoder 200 may be further communicatively coupled with an intra prediction block 215, for key frames and intra-predicted blocks in predicted frames. The intra prediction block 215 may be utilized for the methods and systems described herein for intra prediction modeling. The output of the intra prediction block 215 may be communicatively coupled to an input of a block transform unit 220. The transform 220 may be communicatively coupled to a pyramid vector quantizer (PVQ) 230. In an exemplary embodiment, the transform unit 220 may implement an overlapped transform function. It shall be understood that a separate quantizer parameter determination unit for rate control may feed the quantizer 230 in alternate embodiments, with the signaling between the units indicating which quantizer parameter to use. The output of the quantizer 230 is connected in signal communication with an entropy coder 240, where the output of the entropy coder 240 is an externally available output of the encoder 200.

The output of the quantizer 230 is further connected in signal communication with an inverse quantizer 250. The inverse quantizer 250 is connected in signal communication with an inverse block transform function 260, which, in turn, is connected in signal communication with a reference picture store 270. A first output of the reference picture store 270 is connected in signal communication with a first input of a motion estimator 280 for multiple reference pictures. The input to the encoder 200 is further connected in signal communication with a second input of the motion estimator 280.

The output of the motion estimator 280 is connected in signal communication with a first input of a motion compensator 290. A second output of the reference picture store 270 is connected in signal communication with a second input of the motion compensator 290. The output of the motion compensator 290 is connected in direct signal communication with third input of the transform unit 220.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Aspects of the one or more embodiments described herein may be implemented on one or more computers or processor-based devices executing software instructions. The computers may be networked in a peer-to-peer or other distributed computer network arrangement (e.g., client-server), and may be included as part of an audio and/or video processing and playback system.

Suppose that $m_{i,j}$ is, for example, the intra prediction mode selected for block (i,j), also known as the mode value for block (i,j). A mode (also known as a prediction mode) may be a block classification that informs a decoder module of a predictive strategy to use for the block. The mode value may indicate which mode the encoder or decoder should use for the block. Examples of modes may include different orientations, such as a vertical mode, a horizontal mode, a diagonal mode, and the like. Each mode value may be within a predetermined range of integer values. It may be useful to know the probability $p\,(m_{i,j})$ to make optimal use of entropy coding when encoding the selected mode in the bitstream. In particular, coding can be made more efficient by making use of the context: modes selected for causal neighboring blocks that are already encoded in the bitstream. For example, it is desirable to estimate $p\,(m_{i,j}|m_{i-1,j-1}, m_{i,j-1}, m_{i-1,j})$ If M is the number of possible modes for the block, and N is the number of neighboring blocks considered, then explicit modeling of the conditional probabilities using an explicit table requires $M^{(N+1)}$ entries, which may rapidly becomes prohibitive in terms of memory consumption. For example, with 10 modes and using the left, up-left and up blocks as context requires a table with 10,000 entries. This is one reason why conventional codecs, such as VP9™ developed by Google, Inc. of Mountain View, Calif., only use two neighboring blocks, the left and up blocks as context.

Figure 3:
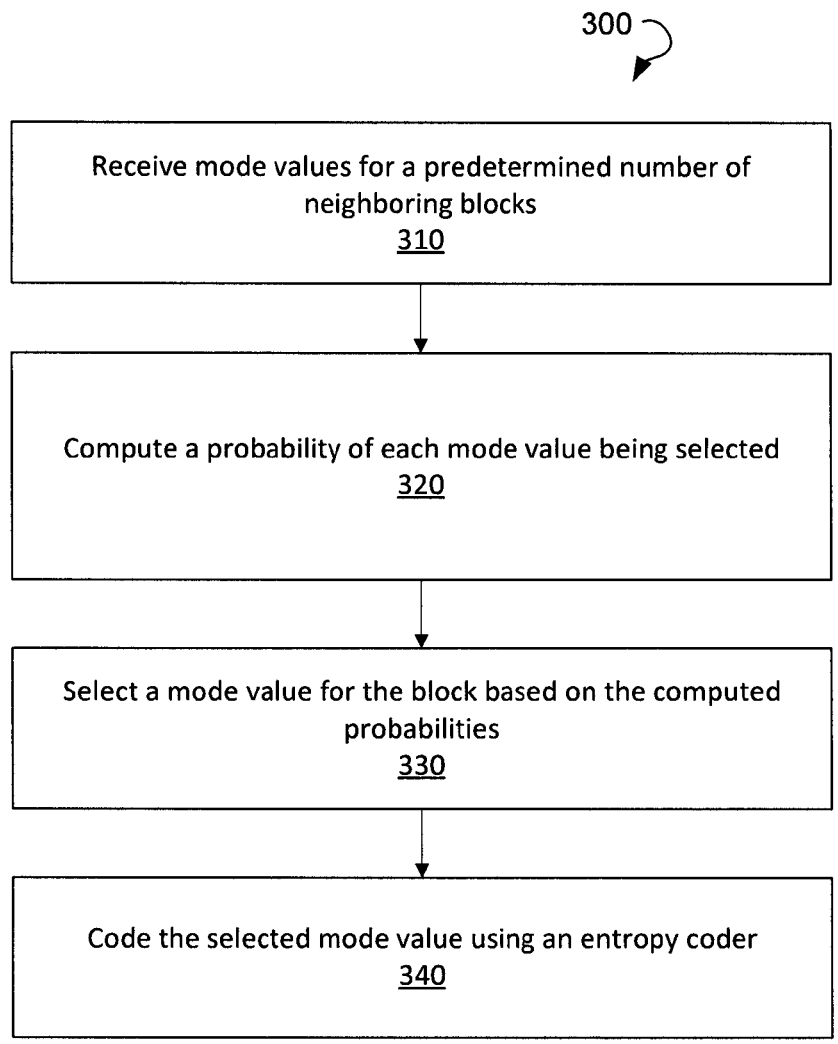
FIG. 3 shows a flow diagram of an exemplary method for predicting a mode value of a block of an image in accordance with various embodiments of the present invention.

FIG. 3 shows a flow diagram of an exemplary method 300 for predicting a mode value of a block of an image in accordance with various embodiments of the present invention. Method 300 may improve substantially on memory consumption compared to conventional codecs, because method 300 performs intra prediction of mode values without resorting to an explicit probability table to model the probabilities for the mode value. A processor, such as a processor in a still image or video encoder or decoder, may receive mode values for a predetermined number of neighboring blocks of the image at step 310. The predetermined number of neighboring blocks may be two blocks, for example a neighboring block directly above and a neighboring block directly to the left of the block, or greater than two neighboring blocks. More blocks improves the accuracy of the intra prediction of the mode of the block, at the expense of greater memory use (to store a larger probability table) and/or greater use of processing resources to determine the probability of the mode value of the block.

Using a probability table, the processor may compute a probability of each mode value in the range of integers being selected for the block, given the mode values for each neighboring block, at step 320. As stated above, method 300 does not use an explicit probability table to model the probabilities for the block. Instead, the size of the context may be reduced by considering only whether the neighboring blocks use the same mode or a different mode from the block. That is, the probability $p\,(m_{i,j}|m_{i-1,j-1}=m_{i,j}, m_{i,j-1}=m_{i,j}, m_{i,j-1}=m_{i,j})$ is modeled instead of $p\,(m_{i,j}|m_{i-1,j-1}, m_{i,j-1}, m_{i-1,j})$. Each probability may correspond to how expensive (in bits) it would be to encode the associated mode value. Because the conditional parameters for the probability table are now binary (equal or not equal), instead of every possible mode value for the neighboring blocks, a lookup probability table may only require $M \cdot 2^N$ entries. Accordingly, only 80 entries for the lookup probability table may be needed when using 3 neighboring blocks to model 10 modes, instead of 10,000 as describe above.

Figure 4:
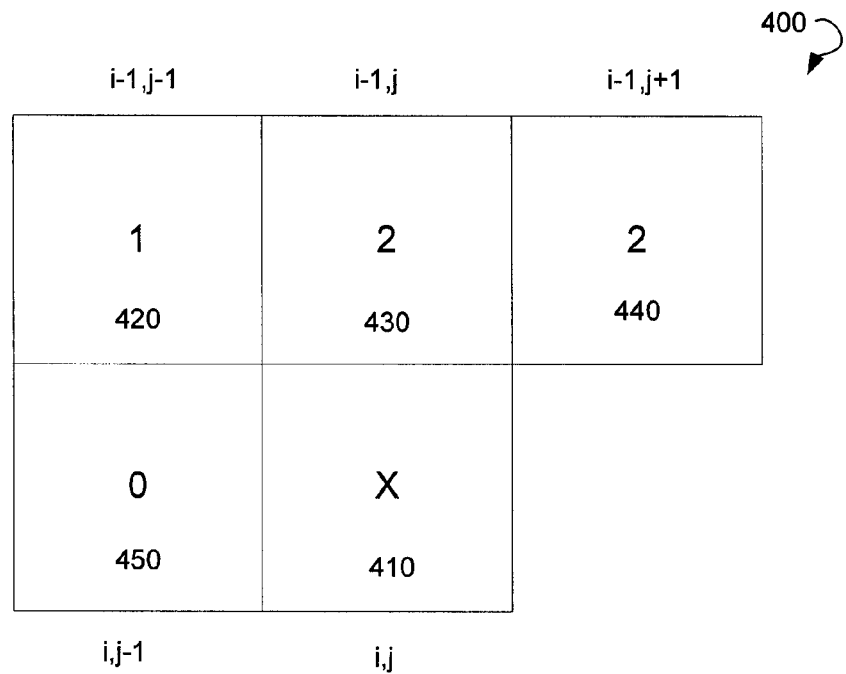
FIG. 4 is a block diagram showing blocks of an image and mode values associated with each block, in accordance with various embodiments of the present invention.

FIG. 4 is a block diagram 400 showing blocks of an image and mode values associated with each block, in accordance with various embodiments of the present invention. In the example of FIG. 4, each block has four modes, and is associated with a mode value ranging between 0 and 3. The probability of selecting the mode value X of block (i,j) 410 may be computed, using the mode values of four neighboring blocks 420, 430, 440, and 450. Table A shows an example probability table for intra prediction of block 410, shown in FIG. 4.

TABLE A

Example Probability Table for Intra Prediction of Block 410

| Combinations | Mode Values | | | |
|---|---|---|---|---|
| | 0 | 1 | 2 | 3 |
| 0000 | | | | $P_3$ |
| 0001 | | | | |
| 0010 | | | | |
| 0011 | | | $P_2$ | |
| 0100 | | $P_1$ | | |
| ... | | | | |
| 1000 | $P_0$ | | | |
| ... | | | | |
| 1110 | | | | |
| 1111 | | | | |

The probability table may have a first axis that includes every integer value within the range of integer values, indicated by the "mode values" in Table A. The probability table may also include a second axis that includes combinations of the neighboring blocks, each combination of the neighboring blocks representing a binary determination whether or not each neighboring block of the predetermined number of neighboring blocks is equal to a corresponding integer value on the first axis. In the example of FIG. 4 and Table A, the first digit in the combinations of table A corresponds to the mode value of block 450, the second digit corresponds to the mode value of block 420, the third digit corresponds to the mode value of block 430, and the fourth digit corresponds to the mode value of block 440. The probability table may be populated by probabilities that the mode value of the block is equal to the corresponding integer value on the first axis. To determine the probability that X is zero, the processor would determine that only block (i,j−1) 450 has a mode value of zero, and would accordingly identify the probability associated with combination 1000 to find the corresponding probability for X, $P_0$. The processor then would repeat the process for each mode value in the range of values to identify $P_1$, $P_2$, and $P_3$ as the probabilities for X to equal 1, 2, and 3 respectively.

Returning to FIG. 3, the processor may select a mode value for the block, based on the computed probabilities of each mode value in the range of integers being selected at step 330. The selecting the mode value for the block may be performed based on at least one of a quality of the prediction and a cost to code the mode value. The cost to code the mode value with an entropy coder may be based on the probability of the mode value in the probability table. The quality of the prediction may be determined by examining the Sum of Absolute Differences, the Sum of Squared Errors, or some other metric between the prediction determined by the mode and the actual contents of the block to be coded. The cost to code a mode value with an entropy coder given its probability is generally proportional to the negative logarithm (for example, the negative base two logarithm) of the probability of the mode value being selected. Using both the quality of the prediction and the coding cost to select the mode value may be advantageous, to increase the accuracy of the prediction.

The processor may then code said mode value of the block using an entropy coder, based on the computed probabilities of each mode being selected, at step 340. In the example of FIG. 4 and Table A, this would mean selecting one of the mode values, 0, 1, 2, or 3, as the mode value X based on the probabilities $P_0$, $P_1$, $P_2$, and $P_3$. As stated above, the selection may be based on a determined cost of coding derived from the probabilities (e.g., selecting the mode value with the lowest cost of coding) and/or a quality of prediction metric. The selected mode may then be coded that mode with an entropy coder. The entropy coder may be any suitable entropy encoder or decoder, such as an arithmetic coder or a Huffman coder.

One drawback of this approach may be that the sum of the probabilities for a block (e.g., in FIG. 4 and Table A, the sum of $P_0$, $P_1$, $P_2$, and $P_3$) may not be equal to one. That is:

$$S_p = \sum_{k=0}^{M} p(m_{i,j} = k \mid m_{i-1,j-1} = k, m_{i,j-1} = k, m_{i-1,j} = k) \neq 1 \quad (1)$$

Therefore, to more accurately model the probabilities for the mode value of the block, so some form of normalization may be useful. In some embodiments, the processor may sum the probabilities associated with an integer value on the first axis of the probability table to produce a probability sum, where the probability sum has a value not equal to one. The processor may then normalize the probabilities associated with the particular combination of neighboring blocks by causing the probability sum to equal one, the normalizing being performed prior to the selecting the mode value for the block. Normalization may be performed as part of an entropy coding process (such as the coding at step 340 above), or may be performed after the selecting the mode value for the block, rather than before, as described above.

One way to normalize probabilities is to multiply each of them by a constant value such that the sum equals 1 (i.e., the value of one divided by the probability sum). If the entropy coder, such as a classic non-binary arithmetic coder or a range coder, is set up to code symbols using cumulative frequency counts, then simply declaring $S_p$ to be the total frequency count allows the entropy coder to perform the renormalization process automatically as part of the coding process. While such an embodiment has the advantage of being simple, the probability modeling may have accuracy problems when one of the probabilities for the mode value is close to unity. Normalizing by multiplying by a constant may be performed before or after selecting the mode value for the block.

A slightly more bit-efficient renormalization procedure may be to first "amplify" probabilities that are close to unity. One exemplary way of doing so may be represented as:

$$p'_k = p_k * \frac{\sum_j p_j - p_k}{1 - p_k} \quad (2)$$

In equation 2, $p'_k$ represents the normalized probability for mode value k, $p_k$ represents the probability of being selected for mode k, and $\Sigma_j p_j$ represents the probability sum. The normalization of equation 2 may, in some embodiments, be performed before the selecting the mode value for the block, to improve accuracy in predicting the mode of the block. The normalization of equation 2 may be further optimized by renormalizing the $p_k'$ to have a sum of 1. That is, the processor may sum each normalized probability associated with the mode value of the block to produce a normalized probability sum. The processor may then renormalize each normalized probability associated with the mode value of the block by causing the normalized probability sum to equal one. The step in equation 2 results in probabilities close to unity being less affected by the normalization, and may slightly improve coding efficiency over the simple normalization described above.

The probability model described herein may be adapted for images as they are encoded/decoded to provide even more accurate probability modeling. A first embodiment is to compute an online probability $p_0$ (m) of mode value m being selected when none of the neighboring blocks use mode m, which is updated as the image is encoded or decoded. Subsequently, $p_0$ (m) may be used as a floor probability for each mode m (for every block in the encoded/decoded image). That is, for a given block, the probability for mode m may be set to the floor probability when the probability for mode m is less than the floor probability for the selected block. The floor probability may be used to ensure that when a particular mode value is highly used in an image, its cost, in term of bits used in entropy coding, goes down.

A second way of adapting the probability model may be to compute an image-wide statistic on a predetermined number of previously-encoded modes. For example, this can be the most often used mode in the frame, the percentage of non-directional modes used, the most common direction, etc. In some embodiments, the image-wide statistic may be for each mode value in the range of integers, and each probability in the probability table may be adjusted by the image-wide statistic. As such, the image-wide statistic can be used as an additional condition on the probability. In that case, the storage requirement for the probability table of FIG. 3 has a size of $M*2^N*S$ where S is the number of possible discrete value for the statistic.

Figure 5:
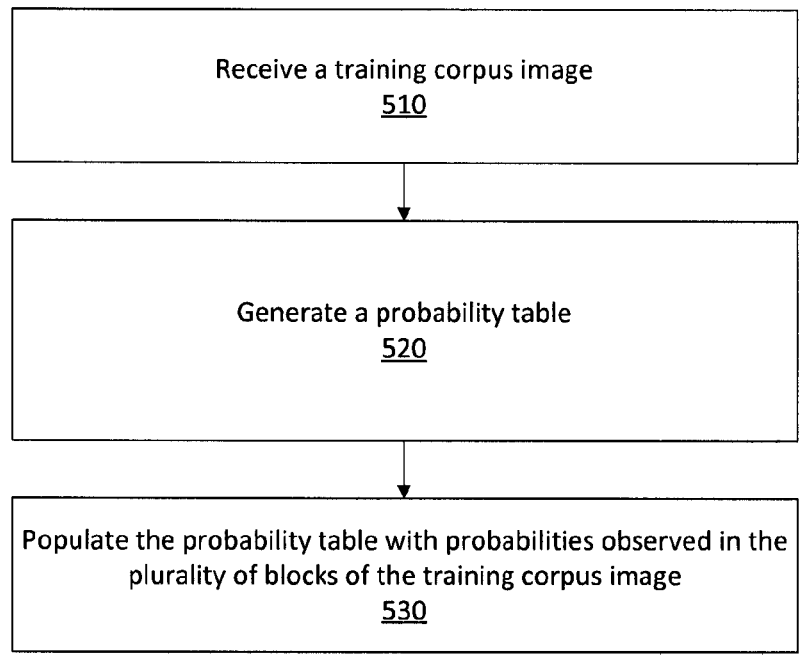
FIG. 5 shows a flow diagram of an exemplary method for generating a probability table based on binary determinations of whether or not neighboring blocks have equal or unequal mode values in accordance with various embodiments of the present invention.

FIG. 5 shows a flow diagram of an exemplary method for generating a probability table based on binary determinations of whether or not neighboring blocks have equal or unequal mode values in accordance with various embodiments of the present invention.

A training corpus image may be received by a processor at step 510. The training corpus image may include a plurality of blocks, each block having a mode value, and each block having a predetermined number of neighboring blocks. Each neighboring block may be associated with a mode value, a mode being a block classification that informs a predictive strategy to use for the block, each mode value falling within a range of integer values. The processor may generate a probability table at step 520. As shown in Table A, the probability table may have a first axis comprising every integer value within the range of integer values. The probability table may also have a second axis comprising combinations of the neighboring blocks, each combination of the neighboring blocks representing a binary determination whether or not each neighboring block of the predetermined number of neighboring blocks has an associated mode value equal to a corresponding integer value on the first axis.

The processor may then populate the probability table probabilities observed in the plurality of blocks of the training corpus image at step 530. The populated probability table may be stored and subsequently used to predict mode values of an image using intra prediction, as described above with respect to FIG. 3.

Figure 6:
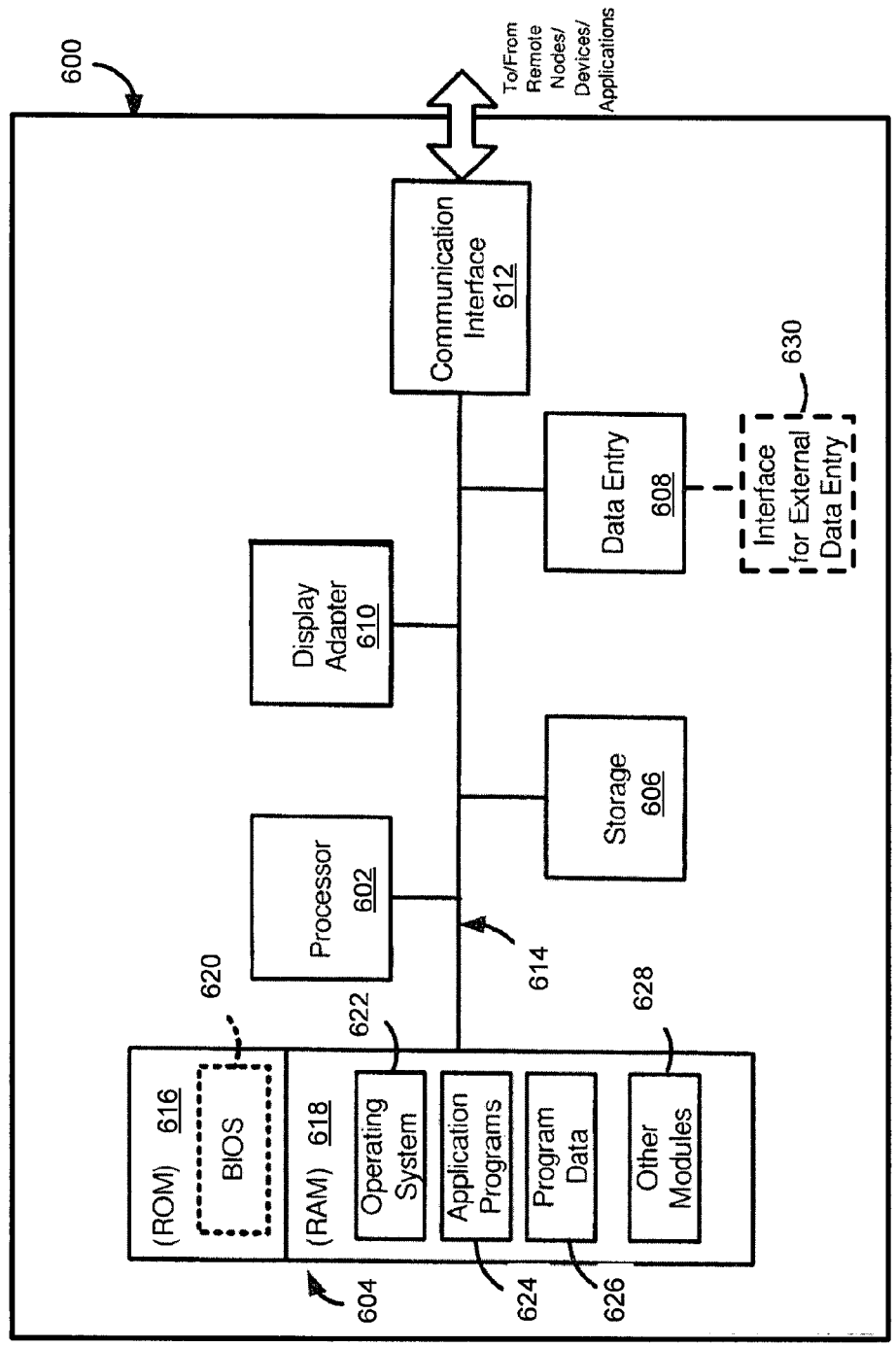
FIG. 6 is a block diagram of an exemplary system for predicting a mode value of a block of an image in accordance with various embodiments of the present invention.

With reference to FIG. 6, an exemplary system for implementing the subject matter disclosed herein, including the methods described above, includes a hardware device 600, including a processing unit 602, memory 604, storage 606, data entry module 608, display adapter 610, communication interface 612, and a bus 614 that couples elements 604-612 to the processing unit 602.

The bus 614 may comprise any type of bus architecture. Examples include a memory bus, a peripheral bus, a local bus, etc. The processing unit 602 is an instruction execution machine, apparatus, or device and may comprise a microprocessor, a digital signal processor, a graphics processing unit, an application specific integrated circuit (ASIC), a field programmable gate array (FPGA), etc. The processing unit 602 may be configured to execute program instructions stored in memory 604 and/or storage 606 and/or received via data entry module 608.

The memory 604 may include read only memory (ROM) 616 and random access memory (RAM) 618. Memory 604 may be configured to store program instructions and data during operation of device 600. In various embodiments, memory 604 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 604 may also include nonvolatile memory technologies such as nonvolatile flash RAM (NVRAM) or ROM. In some embodiments, it is contemplated that memory 604 may include a combination of technologies such as the foregoing, as well as other technologies not specifically mentioned. When the subject matter is implemented in a computer system, a basic input/output system (BIOS) 620, containing the basic routines that help to transfer information between elements within the computer system, such as during start-up, is stored in ROM 616.

The storage 606 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 600.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY™ disc; and the like.

A number of program modules may be stored on the storage 606, ROM 616 or RAM 618, including an operating system 622, one or more applications programs 624, program data 626, and other program modules 628. A user may enter commands and information into the hardware device 600 through data entry module 608. Data entry module 608 may include mechanisms such as a keyboard, a touch screen, a pointing device, etc. Other external input devices (not shown) are connected to the hardware device 600 via external data entry interface 630. By way of example and not limitation, external input devices may include a microphone, joystick, game pad, satellite dish, scanner, or the like. In some embodiments, external input devices may include video or audio input devices such as a video camera, a still camera, etc. Data entry module 608 may be configured to receive input from one or more users of device 600 and to deliver such input to processing unit 602 and/or memory 604 via bus 614.

The hardware device 600 may operate in a networked environment using logical connections to one or more remote nodes (not shown) via communication interface 612. The remote node may be another computer, a server, a router, a peer device or other common network node, and typically includes many or all of the elements described above relative to the hardware device 600. The communication interface 612 may interface with a wireless network and/or a wired network. Examples of wireless networks include, for example, a BLUETOOTH® network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 612 may include logic configured to support direct memory access (DMA) transfers between memory 604 and other devices.

In a networked environment, program modules depicted relative to the hardware device 600, or portions thereof, may be stored in a remote storage device, such as, for example, on a server. It will be appreciated that other hardware and/or software to establish a communications link between the hardware device 600 and other devices may be used.

It should be understood that the arrangement of hardware device 600 illustrated in FIG. 1 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 600. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for predicting a mode value of a block of an image using one of an encoder and a decoder, the method comprising:
   receiving, by a processor, mode values for a predetermined number of neighboring blocks of the image, the predetermined number being at least two, a mode being a block classification that informs a decoder module of a predictive strategy to use for the block, each mode value falling within a range of integer values;
   using a probability table, by the processor, to compute a probability of each mode value in the range of integers given the mode values for each neighboring block, the probability table having a first axis comprising every possible mode value within the range of integer values, and second axis comprising a list of sequences of binary digits representing mode value of the neighboring blocks, each binary digit indicating whether or not a mode value of a neighboring block of the predetermined number of neighboring blocks is equal to a corresponding mode value on the first axis, the probability table being populated by probabilities that mode value of the block is equal to the corresponding mode values on the first axis given the corresponding sequence of binary digits in the second axis, the computing comprising:
      calculating the binary sequence of all of the neighboring blocks for a first mode value on the first axis,
      locating the binary sequence in the second axis that matches the calculated binary sequence of all of the neighboring blocks of the block,
      identifying the probability that the block has a mode value equal to the first mode value based on the located binary sequence in the second axis and the first mode value on the first axis; and
      repeating the calculating the binary sequence, the locating the binary sequence and identifying the probability for every mode value on the first axis; and
   selecting a mode value for the block, by the processor, based on the computed probabilities of each mode value in the range of integers being selected; and
   coding the selected mode value, by the processor, using an entropy coder.

2. The method of claim 1, wherein the selecting the mode value for the block is performed based, in addition to the computed probabilities, on at least one of a maximized quality of the prediction and a minimized cost to code the mode value.

3. The method of claim 2, further comprising:
   summing, by the processor, probabilities associated with the mode value of the block to produce a probability sum, the probability sum having a value not equal to one; and
   normalizing, by the processor, the probabilities associated with the mode value of the block by causing the probability sum to equal one, the normalizing being performed prior to the selecting the mode value for the block.

4. The method of claim 3, wherein the normalizing comprises multiplying each probability associated with the integer value on the first axis of the probability table by a constant value of one divided by the probability sum.

5. The method of claim 3, the normalizing comprising multiplying each probability associated with the integer value on the first axis of the probability table by a value of $$p'_k = p_k * \frac{\sum_j p_j - p_k}{1 - p_k}.$$

6. The method of claim 5, further comprising:
   summing, by the processor, each normalized probability associated with the mode value of the block to produce a normalized probability sum; and
   renormalizing, by the processor, each normalized probability associated with the mode value of the block by causing the normalized probability sum to equal one.

7. The method of claim 1, further comprising adapting the probability table for the image by determining a floor probability value for the block, the floor probability equaling a probability of the mode value of the block equaling a floor mode value when none of the a predetermined number of neighboring blocks of the image has a mode value equal to the floor mode value, and setting a probability of the mode value for the first value to equal the floor probability value in the probability table when the probability for the mode value for the first value is less than the floor probability value.

8. The method of claim 1, further comprising adapting the probability table for the image by determining, by the processor, an image-wide statistic for each mode value in the range of integers, and adjusting each probability of a mode value by multiplying the each probability of the mode value with the image-wide statistic.

9. A method for generating a probability table for predicting a mode value of a block of an image, the generating comprising:
   receiving, by a processor, a training corpus image, the training corpus image comprising a plurality of blocks, each block having a mode value, and each block having a predetermined number of neighboring blocks, each neighboring block being associated with a mode value, a mode being a block classification that informs a predictive strategy to use for the block, each mode value falling within a range of integer values;
   generating, by the processor, a probability table, the probability table having a first axis comprising mode values within the range of integer values, and second axis comprising a list sequences of binary digits representing mode values of the neighboring blocks, each binary digit indicating whether or not a mode value of a neighboring block of the predetermined number of neighboring blocks has an associated mode value equal to a corresponding mode values on the first axis given the corresponding sequence of binary digits in the second axis, the computing comprising:
calculating the binary sequence of all of the neighboring blocks for a first mode value on the first axis,
locating the binary sequence in the second axis that matches the calculated binary sequence of all of the neighboring blocks of the block,
identifying the probability that the block has a mode value equal to the first mode value based on the located binary sequence in the second axis and the first mode value on the first axis; and
repeating the calculating the binary sequence, the locating the binary sequence and identifying the probability for every mode value on the first axis; and
populating, by the processor, the probability table with probabilities observed in the plurality of blocks of the training corpus image, the populated probability table being used to predict mode values of an image using intra prediction.

10. An encoder for predicting a mode value of a block of an image using, the encoder comprising:
a memory, the memory storing a probability table, the probability table having a first axis comprising every integer value within a range of integer values, and second axis comprising a list of sequences of binary digits representing mode values of the neighboring blocks, each binary digit indicating whether or not a mode value of a neighboring block of the predetermined number of neighboring blocks is equal to a corresponding integer value on the first axis, the probability table being populated by probabilities that the mode value of the block is equal to the corresponding integer value on the first axis given the corresponding sequence of binary digits in the second axis; and
a processor, the processor executing instructions to:
receive mode values for a predetermined number of neighboring blocks of the image, the predetermined number being at least two, a mode being a block classification that informs a decoder module of a predictive strategy to use for the block, each mode value falling within the range of integer values;
use the probability table to compute the probability of each mode value in the range of integers given the mode values for each neighboring block, the computing comprising, for each integer in the first axis:
calculating the binary sequence of all of the neighboring blocks for a first mode value on the first axis,
locating the binary sequence in the second axis that matches the calculated binary sequence of all of the neighboring blocks of the block,
identifying the probability that the block has a mode value equal to the first mode value based on the located binary sequence in the second axis and the first mode value on the first axis; and
repeating the calculating the binary sequence, the locating the binary sequence and identifying the probability for every mode value on the first axis; and
select a mode value for the block, based on the computed probabilities of each mode value in the range of integers being selected; and
code the selected mode value using an entropy coder.

11. The system of claim 10, wherein the selecting the mode value for the block is performed based, in addition to the computed probabilities, on at least one of a maximized quality of the prediction and a minimized cost to code the mode value.

12. The system of claim 11, the processor further executing instructions to:
sum probabilities associated with the mode value of the block to produce a probability sum, the probability sum having a value not equal to one; and
normalize the probabilities associated with the mode value of the block by causing the probability sum to equal one, the normalizing being performed prior to the selecting the mode value for the block.

13. The system of claim 12, wherein the normalizing comprises multiplying each probability associated with the mode value of the block by a constant value of one divided by the probability sum.

14. The system of claim 12, the normalizing comprising multiplying each probability associated with the mode value of the block by a constant value of $$p'_k = p_k * \frac{\sum_j p_j - p_k}{1 - p_k}.$$

15. The system of claim 14, the processor further executing instructions to:
sum each normalized probability associated with the mode value of the block to produce a normalized probability sum; and
renormalize each normalized probability associated with the mode value of the block by causing the normalized probability sum to equal one.

* * * * *